Patented June 12, 1945

2,377,995

UNITED STATES PATENT OFFICE 2,377,995

VITRIFIED GRINDING WHEELS

Loring Coes, Jr., Brookfield, Mass., assignor to Norton Company, Worcester, Mass., a corporation of Massachusetts No Drawing. Application September 7, 1944, Serial No. 553,111

6 Claims. (Cl. 51—295)

This invention relates to an abrasive wheel and more particularly to a grinding wheel made of vitrified bonded abrasive grains which has its pores filled with material capable of modifying the grinding action.

It has been proposed heretofore to impregnate the pores of a vitrified grinding wheel with a phenol formaldehyde resin. This type of condensation product is in the liquid or A stage condition when incorporated in the pores; and the condensation reaction develops a large quantity of water which has to be evaporated during the cure. The escape of the steam tends to remove the filling material from the pores to an extent depending on the pore sizes and arrangements.

A primary object of my invention is to fill the pores of such a wheel completely and with a resinous material which imports desired properties to the structure.

In accordance with my invention, I propose to incorporate in a vitrified wheel various granular active fillers which give beneficial effects at the grinding line.

Another object of the invention is to incorporate the filler in the wheel as a suspension in a fluid matrix which may be thereafter set into a permanent condition so as to hold the filler in place.

A further object is to fill the pores of a vitrified abrasive wheel with a resin type of material which will minimize loading of the wheel during the grinding operation and which also presents an active granular filler at the grinding line. Other objects will be apparent in the following disclosure.

In accordance with this invention, I provide a porous wheel made of abrasive grains bonded by a vitrified ceramic material, and I fill the pores thereof with a filler formed of furfuryl alcohol polymerized with lignin. This viscous medium will carry a granular filler into the wheel pores and may be thereafter polymerized and thus hold the filler in place.

Lignin may be prepared by desulphonating an impure lignin product obtained from the sulphite paper making process. The material is a polymerized powder which is not moldable by itself. It is, however, soluble in furfuryl alcohol, and the solution may be polymerized with the aid of a catalyst, such as toluene sulphonic acid. This catalyst is preferably dissolved in furfural so as to slow down the explosive-like polymerization reaction caused by the catalyst. The lignin dissolved in the furfuryl alcohol solution may be incorporated in the grinding wheel pores and the mass thereafter polymerized in place. Also, this solution of lignin and furfural in furfuryl alcohol constitutes a suitable matrix for suspending various types of active powdered inorganic fillers, as it has a sufficiently viscous body to hold the same as a dispersion or in suspension and carry them into the wheel pores. Suitable active fillers are sulphur, cryolite, iron pyrite or other iron sulphides, potassium calcium sulphate and alkali metal flureroborate. The fillers are used in a finely powdered condition and in any desired quantity.

As an example illustrating the manufacture of a grinding wheel which is suitable for snagging purposes, I may first select any desired type of wheel made of abrasive grains, such as crystalline alumina, silicon carbide or other abrasives, bonded by vitrified ceramic material. The wheel may be made in accordance with standard practice and its porosity may be brought to a desired volume percentage by the methods set forth in the patent to Howe and Martin #1,983,082 of December 4, 1934. In order to prepare the resin, I may dissolve 120 grams of paratoluene sulphonic acid in 1300 cc. furfural which is well cooled during the procedure. Thereafter, 2190 grams of a desulphonated lignin resin, which is sold commercially under the name of Meadol, is stirred into the furfural. Then 4380 grams of furfuryl alcohol is added rapidly and with good cooling so as to prevent polymerization. This solution may be incorporated into the pores of a vitrified bonded grinding wheel or other abrasive article without the use of a supplemental granular filler. I may, however, add any of the above fillers thereto in order to modify the grinding action. For example, I may incorporate 7500 grams of finely ground iron pyrite in the resin solution as thus prepared.

This resin solution, whether or not it contains the granular filler, may be put into the wheel pores by the mere act of immersing the wheel in the solution. For example, I may employ an open topped mold or receptacle within which the wheel will loosely fit. The solution is placed in the mold, and the wheel is then slowly lowered into it as the solution penetrates the pores. While the wheel remains in the mold, the body is subjected to heat in order to harden the resin solution. This may be accomplished by heating the wheel for 48 hours at 90° C. and then at 150° C. for an additional 8 hours. It is to be observed that since there is no formation of steam or other objectionable gas by polymerization of this resin solution, it is not necessary to confine the wheel in a pressure mold. In fact, the wheel may be removed from the reservoir container as soon as the polymerization has hardened the material in the surface pores. Hence expensive pressure molding equipment is not tied up in this process.

A wheel made in accordance with the above process with iron pyrite as a filler was subjected to a wheel wear test in comparison with an untreated wheel of the same abrasive, bond, volume structure and grade of hardness, with the results shown by the following table:

|  | Wheel wear in cubic inches | Metal removed pounds per hour | Quality number |
| --- | --- | --- | --- |
| Treated wheel | 6.3 | 7.6 | 14 |
| Untreated wheel | 7.8 | 6.3 | 9 |

In the above table, the quality number $$Q = K\frac{M^2}{W}$$

where K is a constant, M is the material removed in pounds per hour and W is the wheel wear in cubic inches. It will therefore be seen from the above table that the treated wheel is far superior to the untreated wheel.

Furfuryl alcohol tends to swell when polymerized and to form a weak brittle body which has but little value as a filler for a grinding wheel. The lignin slows down the rate of polymerization and gives a strong dense product. The furfural copolymerizes with the alcohol so that the entire matrix is a solid resin strong enough to support the inorganic or granular filler and hold it in place at the grinding line while the abrasive grains are involved in the grinding action. The different materials are comparatively cheap and easily obtained. The rate of polymerization or heat hardening of the resin solution is sufficiently rapid to present a commercially feasible process. There is no volatile matter evolved during polymerization; hence the pores may be entirely filled. The resin not only holds the grains firmly in place but also acts beneficially in preventing loading of the wheel pores during a dry grinding or snagging operation. The proportions of the ingredients may be widely changed, as will be readily appreciated by one skilled in the art.

It will now be understood that the above disclosure is intended to illustrate the principles of this invention and a preferred embodiment thereof and not as imposing limitations on the appended claims.

I claim:

1. An abrasive article comprising abrasive grains bonded as a porous body by means of vitrified ceramic material and a filler incorporated in the pores comprising furfuryl alcohol polymerized with lignin.

2. An abrasive article comprising a porous body of abrasive grains bonded by a vitrified ceramic material and a filler incorporated in the pores formed of a granular material suspended in and held in place by a resin matrix comprising polymerized furfuryl alcohol and lignin.

3. An abrasive article comprising a porous body of abrasive grains bonded by a vitrified ceramic material having the pores substantially filled with a filler comprising the polymerization product of a solution of lignin and furfural in furfuryl alcohol heated in situ.

4. The method of making an abrasive article comprising the steps of providing a porous body of abrasive grains bonded by a vitrified ceramic material, incorporating lignin in a fluid comprising furfuryl alcohol, incorporating the fluid in the pores of the body and thereafter heating the same to polymerize the fluid and form a solid mass thereof.

5. The method of making an abrasive article comprising the steps of providing a porous body of abrasive grains bonded by vitrified ceramic material, dissolving lignin in a fluid comprising furfural and furfuryl alcohol, incorporating the solution in the pores of the abrasive body, and thereafter heating the body while holding the fluid therein and polymerizing the mass.

6. The method of making an abrasive article comprising the steps of providing a porous body of abrasive grains bonded by a vitrified ceramic bond, dissolving lignin in a fluid comprising furfuryl alcohol and furfural and forming a viscous matrix, mixing a granular filler in the matrix and forming a suspension thereof, incorporating the suspension in the pores of said body, and while retaining the suspension in situ heating the body and polymerizing the matrix and thus securing the filler in place.

LORING COES, Jr.